US 6,567,102 B2

(12) United States Patent
Kung

(10) Patent No.: US 6,567,102 B2
(45) Date of Patent: May 20, 2003

(54) TOUCH SCREEN USING PRESSURE TO CONTROL THE ZOOM RATIO

(75) Inventor: Shao-Tsu Kung, Taipei (TW)

(73) Assignee: Compal Electronics Inc., Neibu County (TW)

( * ) Notice: Subject to any disclaimer, the term of this patent is extended or adjusted under 35 U.S.C. 154(b) by 3 days.

(21) Appl. No.: 09/683,132

(22) Filed: Nov. 25, 2001

(65) Prior Publication Data

US 2002/0180763 A1 Dec. 5, 2002

(30) Foreign Application Priority Data

Jun. 5, 2001 (TW) .......................................... 90113534

(51) Int. Cl.[7] ................................................ G09G 5/00
(52) U.S. Cl. ........................ 345/660; 345/668; 345/173
(58) Field of Search ................................ 345/660, 667, 345/668, 671, 173, 174

(56) References Cited

U.S. PATENT DOCUMENTS 5,615,384 A * 3/1997 Allard et al. ................ 345/173
6,073,036 A * 6/2000 Heikkinen et al. .......... 455/575

* cited by examiner

Primary Examiner—Matthew Luu
(74) Attorney, Agent, or Firm—Winston Hsu

(57) ABSTRACT

A touch screen that uses pressure to control the zoom ratio and the zoom area. The touch screen has a display panel, a touch sensor, and a display control. The display panel is used to display an image. The touch sensor is used to sense the position and intensity of the pressure exerted on the touch screen. The display control is connected to the display panel and the touch sensor. Pressure exerted on the touch sensor is interpreted by the display control to change the zoom area and the zoom ratio of the image on the display panel.

10 Claims, 17 Drawing Sheets

TOUCH SCREEN USING PRESSURE TO CONTROL THE ZOOM RATIO

BACKGROUND OF INVENTION

1. Field of the Invention

The present invention relates to a touch screen, more specifically, to a touch screen that uses pressure to control the zoom ratio.

2. Description of the Prior Art

In modern society, computer systems are no longer viewed as costly toys reserved for the wealthy, but as necessities for ordinary people in their daily lives. Nowadays, nearly everyone has a computer system, such as a desktop computer, a laptop computer, or a personal digital assistant (PDA). Just as computer systems have become more advanced, computer monitors are constantly being redesigned to be thinner, lighter, and more convenient to use. One of the most recent innovations in computer monitor technology is the touch screen.

Among touch screens, there are two prior art that deal with zooming in on images. Please refer to FIG. 1A, FIG. 1B, and FIG. 1C. The FIG. 1A is a diagram of the unmagnified display 10 of a screen showing an image. FIG. 1B is a diagram of a display 20 showing an image magnified using the first method of magnification. FIG. 1C is a diagram of a display 30 showing an image magnified using the second method of magnification. The first prior art pertaining to magnification showed in FIG. 1B is magnifying the upper-left section of the imaged in FIG. 1A by a predetermined zoom ratio. If the user wants to view other parts of the image, he can control the horizontal scrolling bar 22 and vertical scrolling bar 24 to move to the part of the image he wishes to view. The second prior art pertaining to magnification shown in FIG. 1C is magnifying the part of the imaged in FIG. 1A under the zoom area 32 by a predetermined zoom ratio and displaying it in the zoom area 32. The user can move the zoom area 32 to view different parts of the imaged in FIG. 1A. This kind of operation simulates viewing the imaged in FIG. 1A under a magnifying glass.

Among the disadvantages of the two prior arts of magnification mentioned above is that it is not convenient to use a fixed zoom ratio for all zoom functions. It can also be cumbersome to use a zoom window that cannot be easily adjusted according to the needs of the user.

SUMMARY OF INVENTION

It is therefore an objective of the claimed invention to solve the problems mentioned above by providing a touch screen that uses pressure to control the zoom ratio.

The claimed touch screen, briefly summarized, comprises a display panel, a touch sensor, and a display control. A display panel is used to display an image. A touch sensor is used to sense the intensity and position of an external force and generate a corresponding pressure signal and position signal.

A display control is connected to the display panel and the touch sensor for controlling the image and zooming in on a portion of the image according to the pressure signal and position signals. A predetermined conversion model is used to derive the zoom ratio from the pressure signal generated by the touch sensor.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
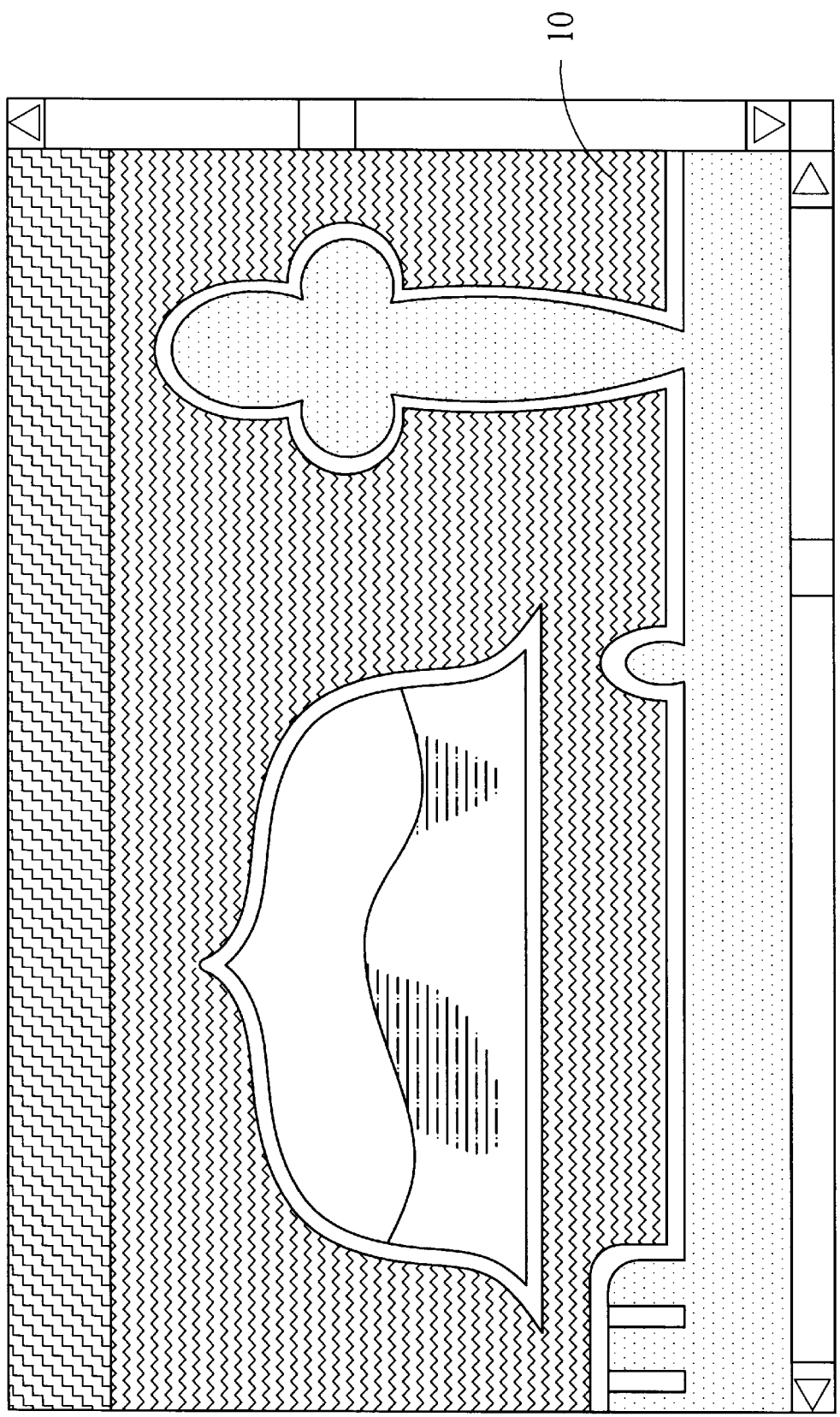
FIG. 1A is a diagram of the display of a screen showing an unmagnified image.
Figure 1B:
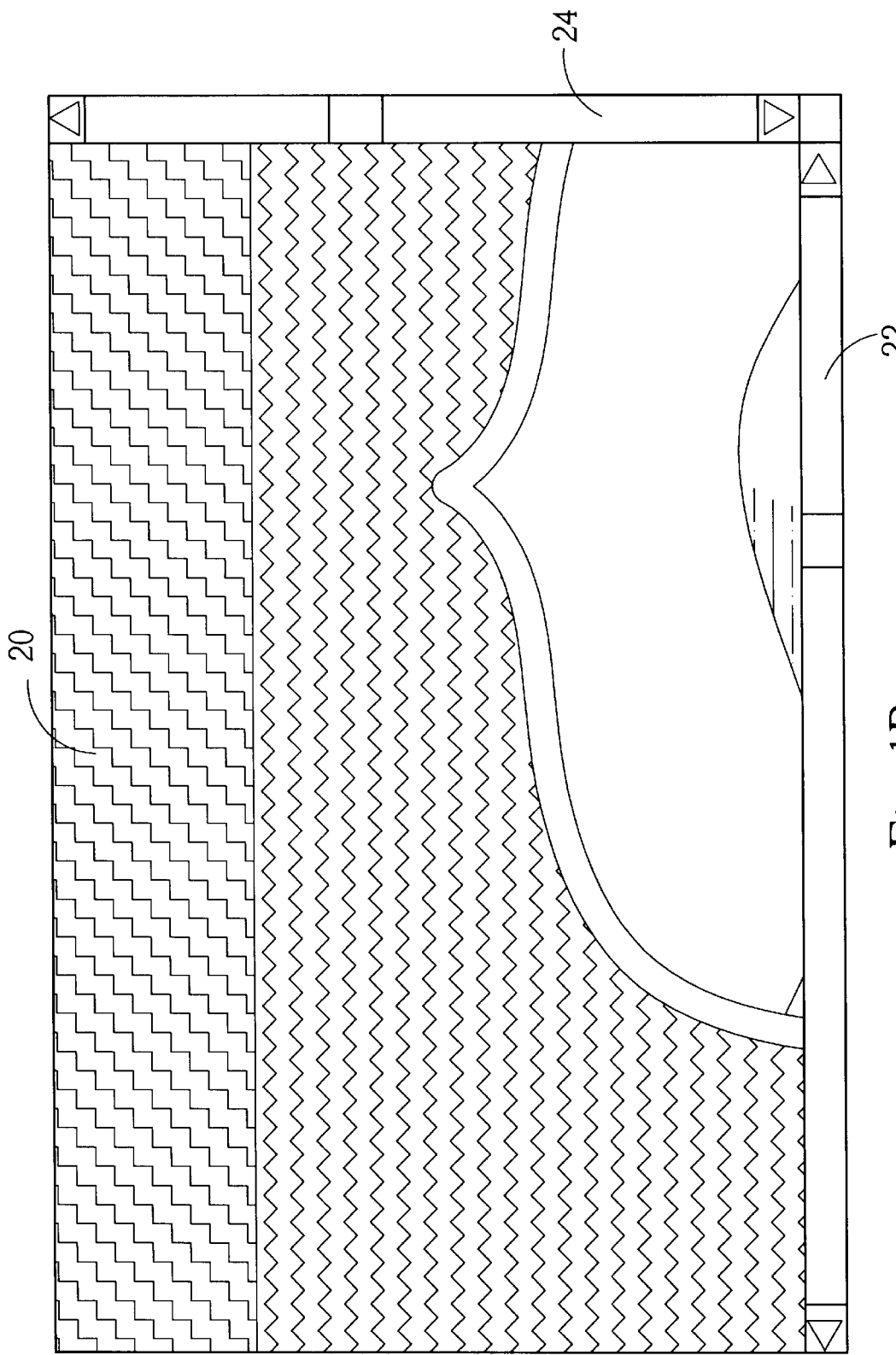
FIG. 1B is a diagram of the display of a screen showing an image magnified using the first method of magnification.
Figure 1C:
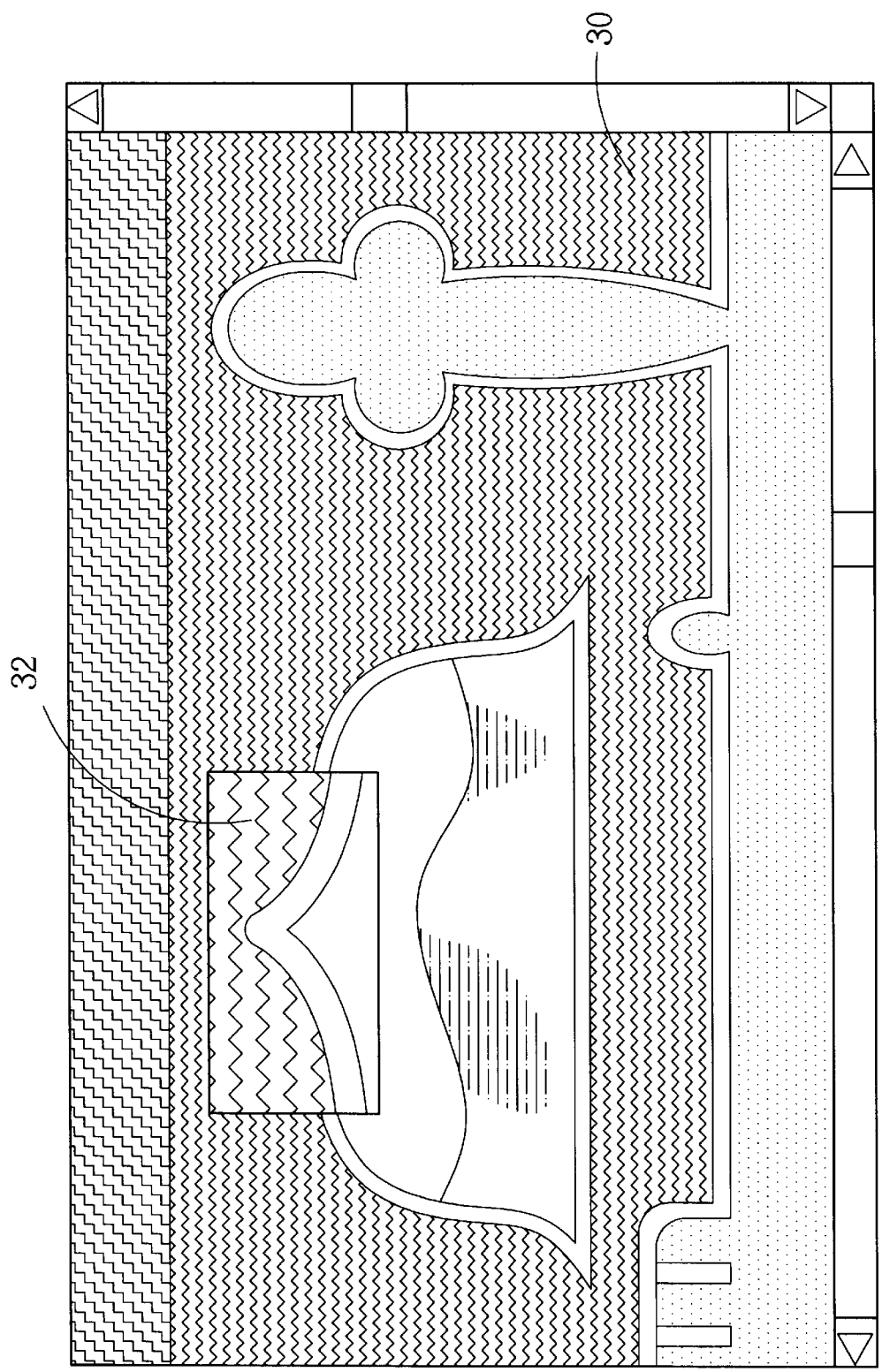
FIG. 1C is a diagram of the display of a screen showing an image magnified using the second method of magnification.
Figure 2:
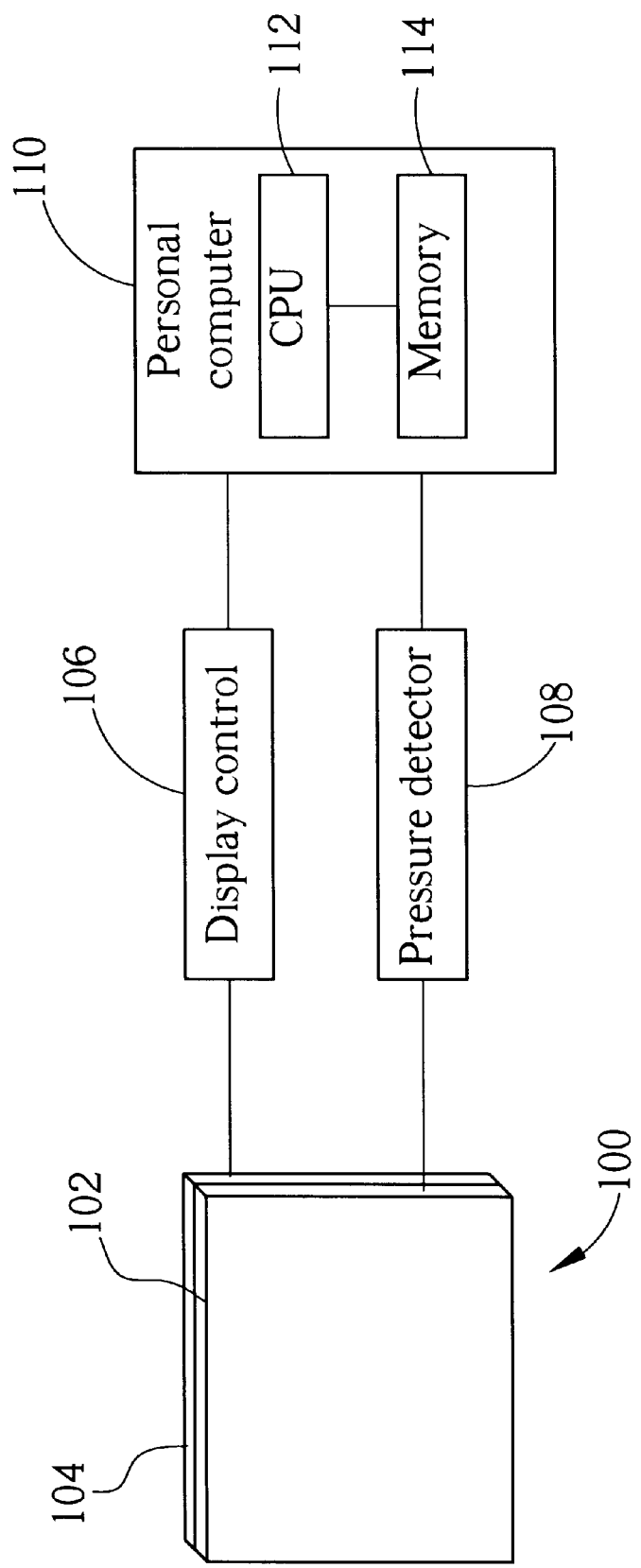
FIG. 2 is a function diagram of the touch screen.

Please refer to FIG. 2, which is the function diagram of the touch screen. The present invention provides a touch screen 100 that interprets the pressure exerted upon it to control the zoom ratio. The touch screen 100 comprises a display panel 104, a sensing plate 102, a display control 106, and a pressure detector 108. The display panel 104 is used to display the image. The sensing plate 102 and the pressure detector 108, which are housed in the display panel 104, form a touch sensor. The sensing plate 102 detects the intensity and position of an external force exerted upon the display panel and generates a corresponding pressure and position signal. The display control 106 is connected to the display panel 104 and the touch sensor. The display control 106 controls the image shown on the display panel 104, and zooms in on a portion of the image according to the position signal generated by the touch sensor. With the operation of a central processing unit (CPU) 112 and a memory 114 of a personal computer 110, a portion of the image mentioned above is magnified by a zoom ratio. A predetermined conversion model is used to derive the zoom ratio from the pressure signal generated by the touch sensor.

Figure 3:
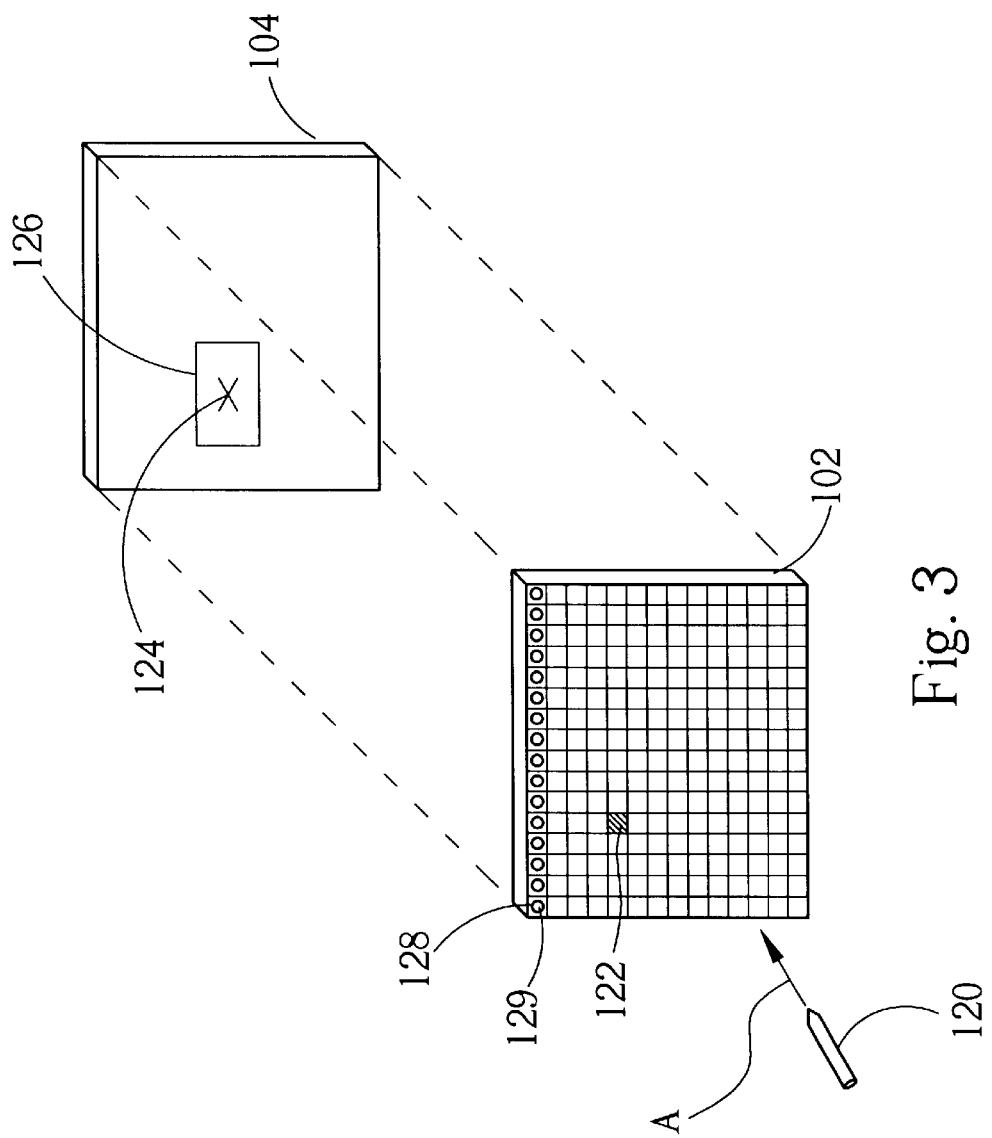
FIG. 3 is a detailed structure diagram of the touch screen as illustrated in FIG. 2.
Figure 4:
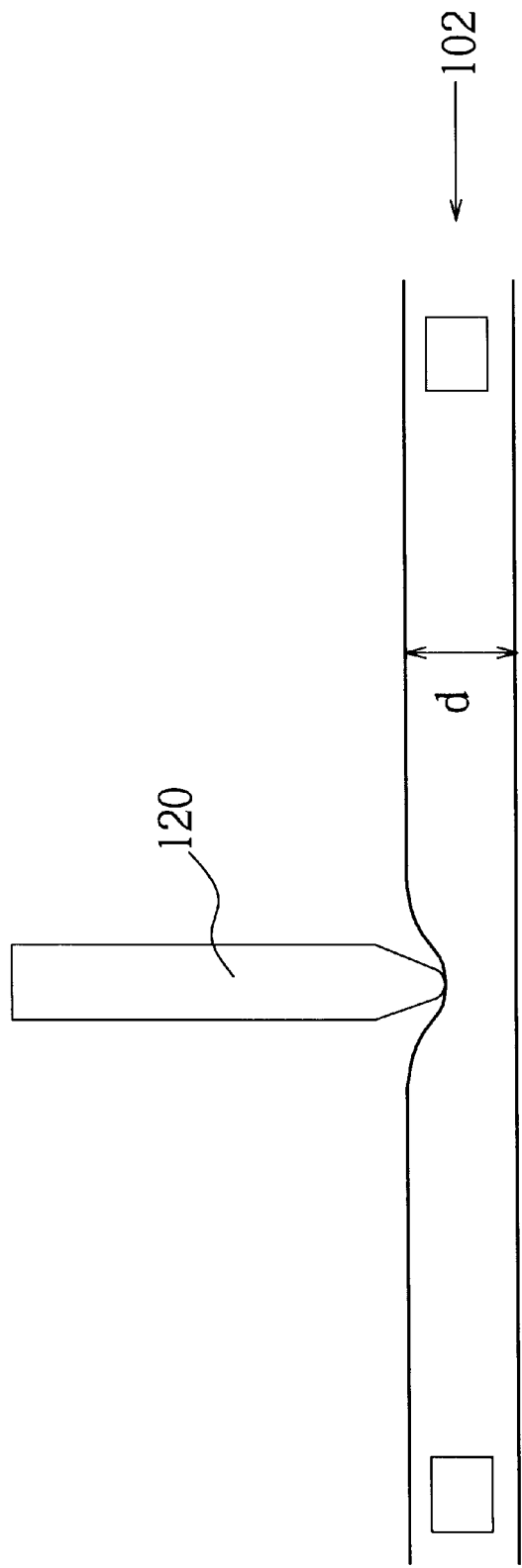
FIG. 4 is a diagram detailing the measurement of pressure when something contacts with the touch screen.

Please refer to FIG. 3, which is a detailed structure diagram of the touch screen 100. A sensing plate 102 is fixed on the display panel 104. A sensing plate 102 comprises a plurality of sensing units 128 each positioned at a predetermined position on the display panel 104 for detecting intensity of an external force. As illustrated in FIG. 4, the external force is generated when a controlling pen 120 touches a touching point 122 on the sensing plate 102 along one direction A. A pressure detector 108 is electrically connected to the sensing plate 102. The pressure detector 108 detects the intensity and position of the external force imposed on the sensing plate 102, and generates corresponding pressure and position signals.

The method of detecting pressure on a touch screen 100 according to the present invention is that every sensing unit 128 comprises one capacitor 129. When there is an external force imposed on the sensing units 128, there is a change in the capacitance of the capacitor 129. The method of detecting the capacitance of the capacitor 129 shall not be further elaborated, as it is well known to those who are familiar with such technology. The pressure detector 108 generates the corresponding pressure signal by using the capacitance of the sensing unit 128 and a corresponding position signal 124 using a position 122 of the sensing unit 128.

Please refer to FIG. 4, which is a diagram of the measurement of pressure when an object makes contact with the touch screen 100 as illustrated in FIG. 3. When a control pen 120 touches a touch point 122 of the sensing plate 102, the distance the control pen pushes down on the sensing plate 102 changes according to the intensity of the pressure exerted on the touch side 102. The original thickness of a sensing plate 102 is d. The sensing plate 102 is made of a soft, flexible, and thin film, so the more pressure the control pen 120 exerts, the less the thickness d of the sensing plate 102 at the touch point 122. Likewise, the less pressure the control pen 120 exerts, the greater the thickness d of the sensing plate 102. The relationship between the capacitance of the capacitor 129 and the thickness d of the sensing plate 102 can be described as:

Capacitance $C = A/d$

When more pressure is exerted, the value of d decreases, resulting in increased capacitance.

Figure 5:
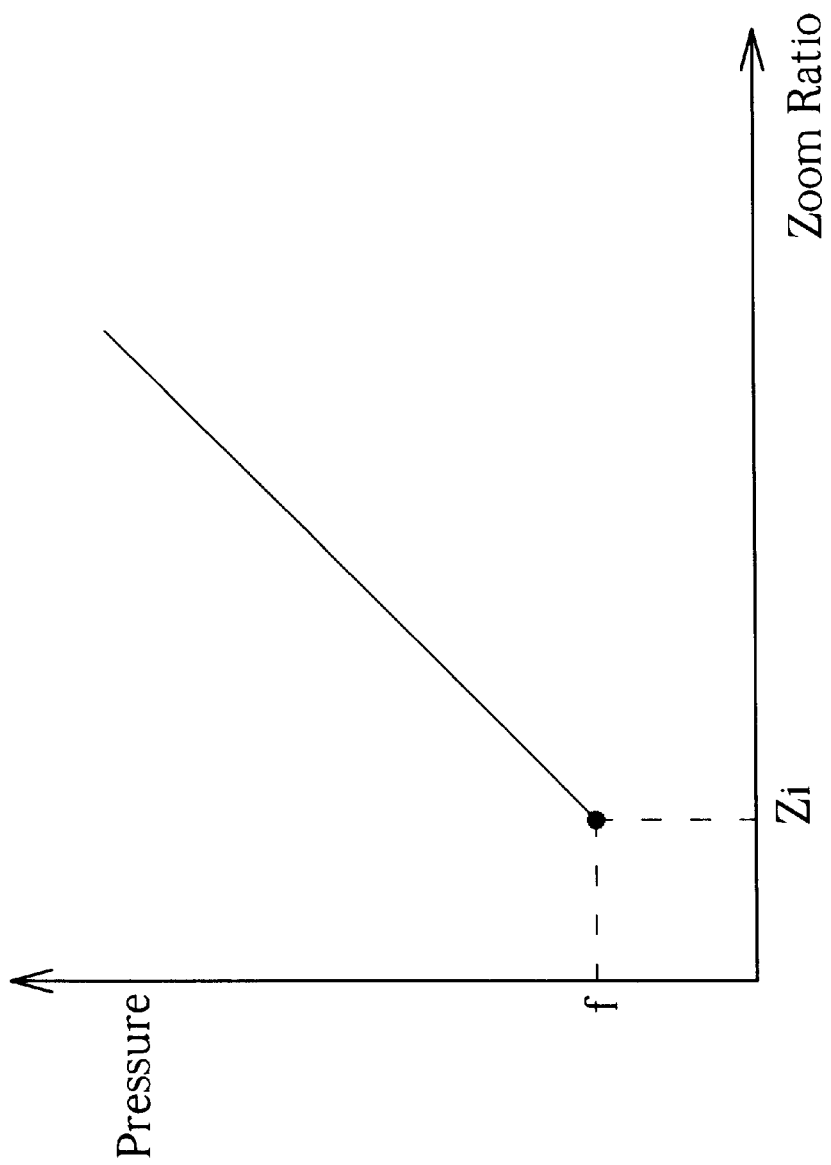
FIG. 5 is a diagram of a linear relationship between the pressure imposed on the touch screen 100 and the zoom ratio.
Figure 6:
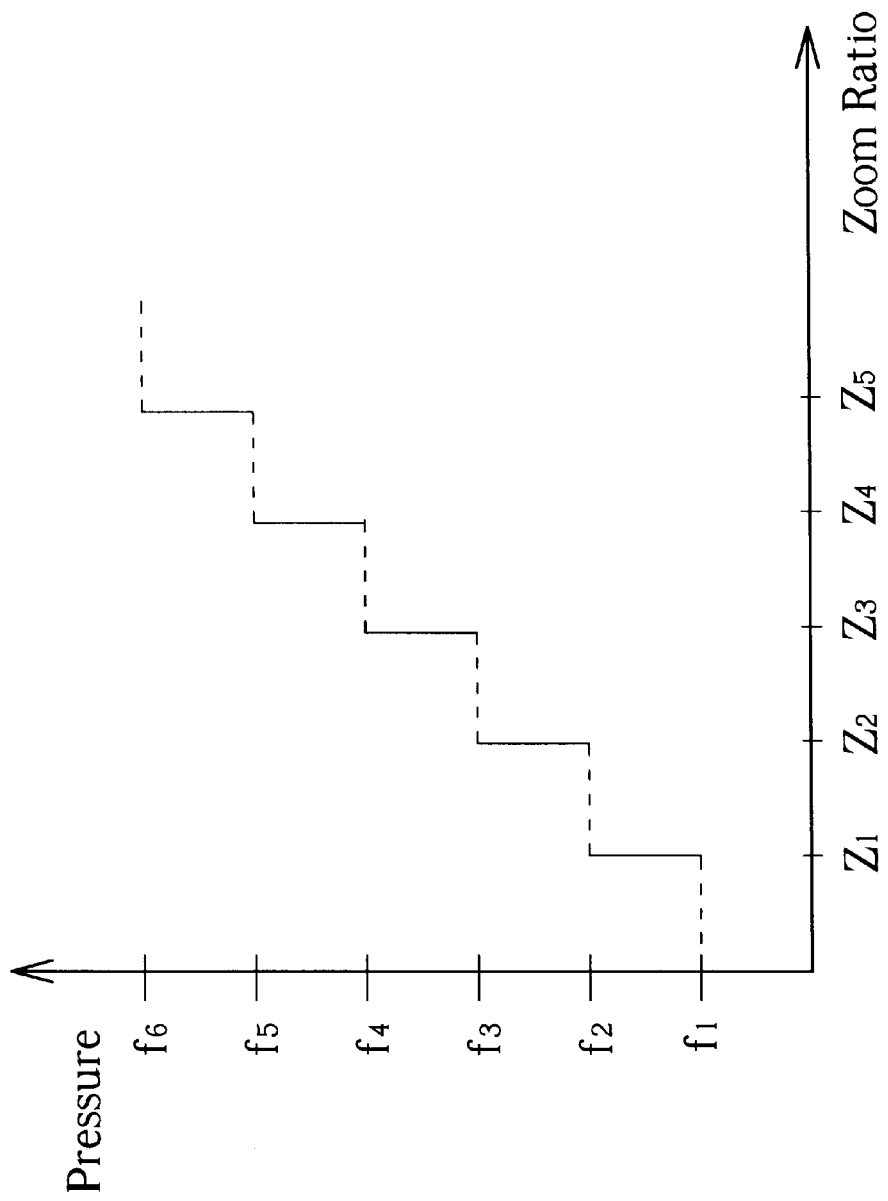
FIG. 6 is a diagram of a tiered relationship between the pressure imposed on the touch screen 100 and the zoom ratio.

Please refer to FIG. 5 and FIG. 6. FIG. 5 is a diagram of a liner relationship between the pressure exerted on the touch screen 100 and the zoom ratio. FIG. 6 is a diagram of a tiered relationship between the pressure exerted on the touch screen 100 and the zoom ratio.

As FIG. 5 illustrates, the display control 106 of the touch screen 100 converts the pressure signal generated by the touch sensor to a corresponding zoom ratio according to a linear conversion model. When the pressure signal f is less than a certain intensity, the zoom ratio remains unchanged, and no zoom operation occurs. When the pressure signal f is greater than a certain intensity, the zoom ratio changes linearly according to the pressure signal f. This means that the zoom ratio increases or decreases in response to a larger or smaller signal. Because the user might have difficulty holding the control pen 120 perfectly steady when pressing the touch screen 100, the use of a linear relationship may make the zoom ratio wobble according to changes in the pressure signal.

As FIG. 6 illustrates, the display control 106 of the touch screen 100 converts the pressure signal, which is generated from the touch sensor, to a corresponding zoom ratio according to a tiered conversion model. The tiered conversion model has a plurality of pressure sections such as f1~f2, f2~f3, f3~f4, f4~f5, and f5~f6, etc. Every pressure section corresponds to a fixed zoom ratio. For example, the section f1~f2 corresponds to z1, section f2~f3 corresponds to z2, section f3~f4 corresponds to z3, section f4~f5 corresponds to z4, and section f5~f6 corresponds to z5, etc. When the display control 106 receives a pressure signal that falls within one of the pressure sections, the pressure signal is converted to the corresponding zoom ratio.

Figure 7A:
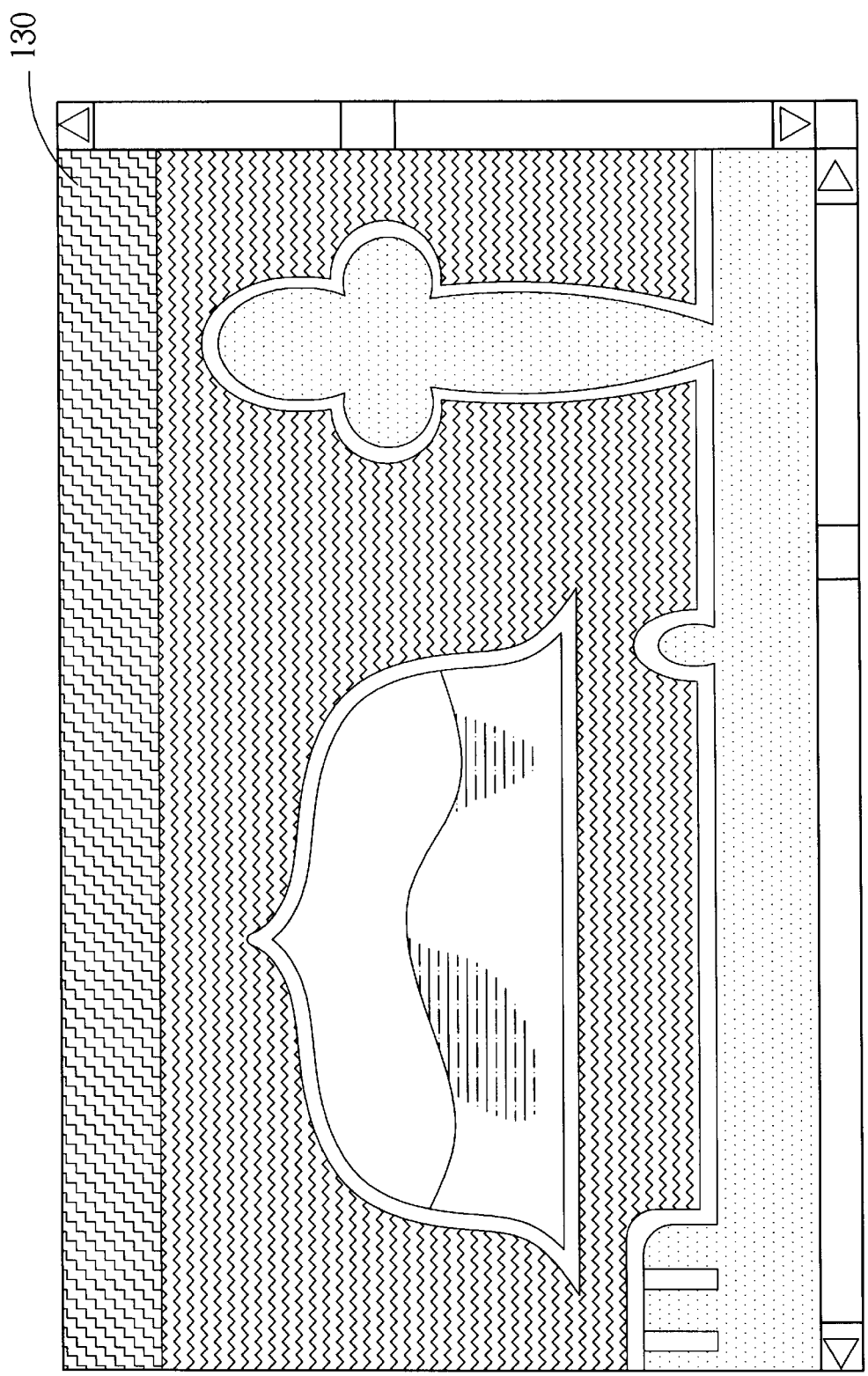
FIG. 7A is a diagram of the display of a screen showing an unmagnified image.
Figure 7B:
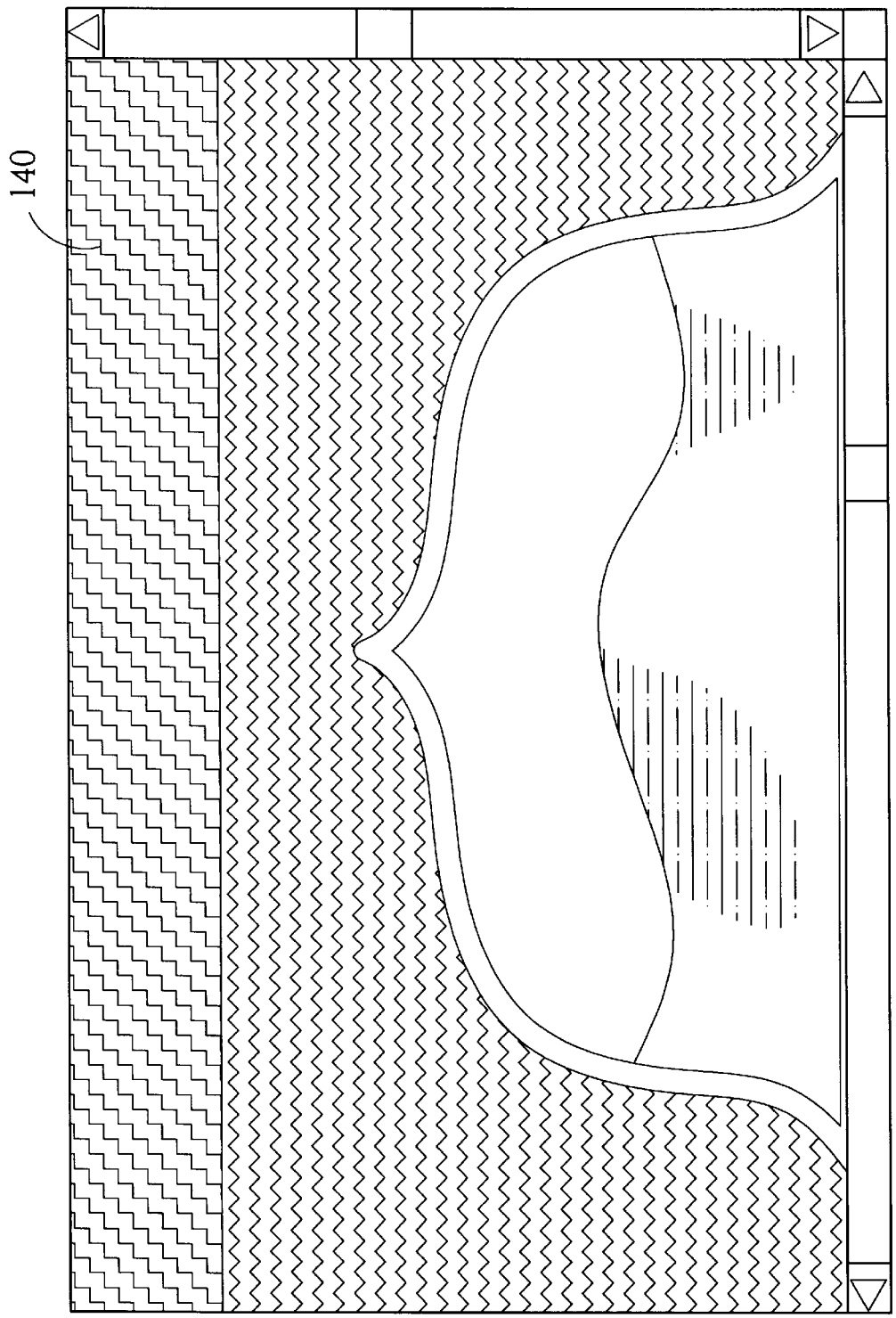
FIG. 7B is a diagram of the display of a screen showing an image magnified under light pressure using the first method of magnification.
Figure 7C:
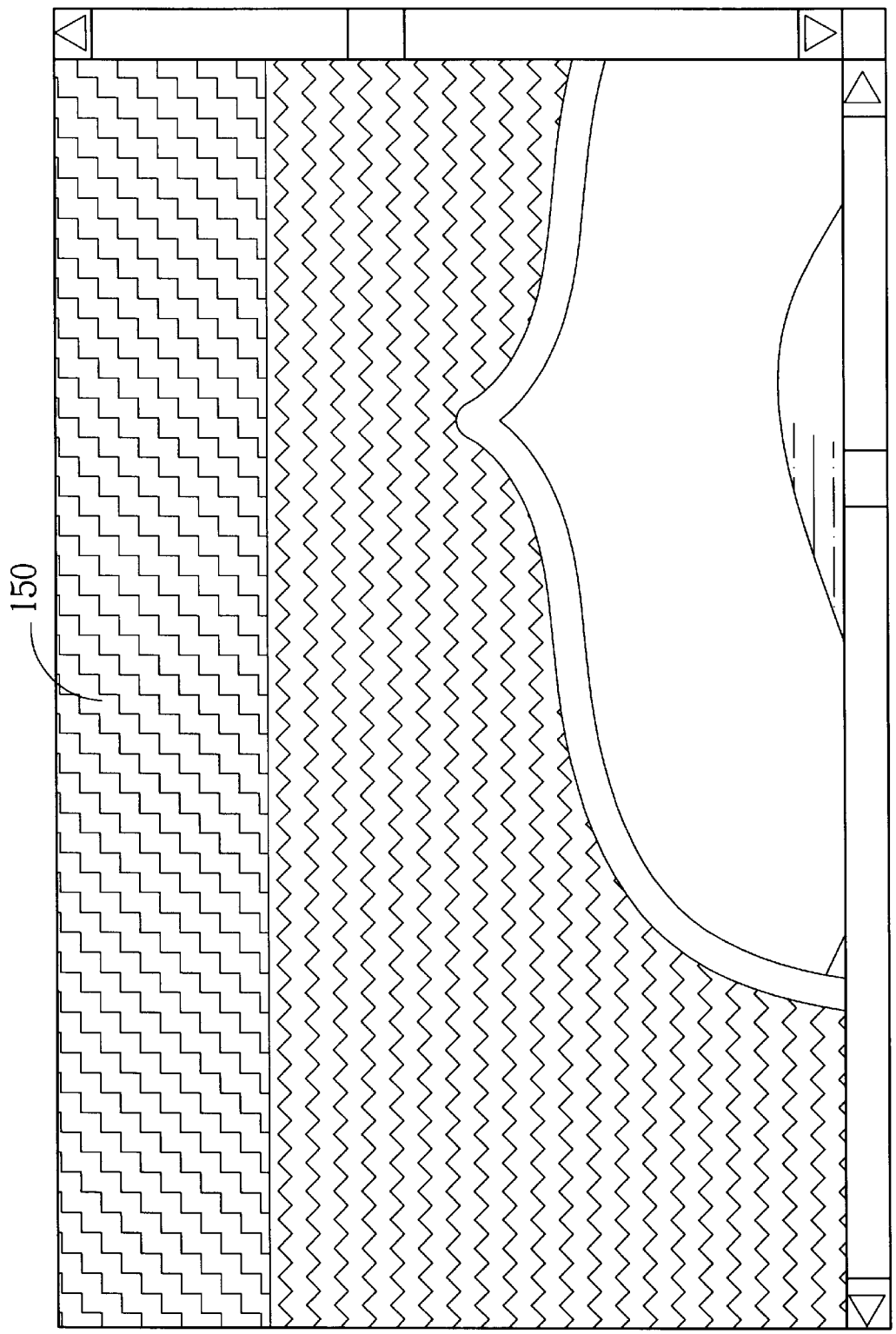
FIG. 7C is a diagram of the display of a screen showing an image magnified under greater pressure using the first method of magnification.

Please refer to FIG. 7A, FIG. 7B, and FIG. 7C. FIG. 7A is a diagram of the display 130 of a touch screen 100 showing an unmagnified image. FIG. 7B is a diagram of a display 140 of a touch screen 100 showing an image magnified under light pressure using the first method of magnification. FIG. 7C is a diagram of a display 150 of a touch screen 100 showing an image magnified under greater pressure using the first method of magnification. The display control 106 of the touch screen 100 zooms the portion of the image that corresponds to the position signal generated by the touch sensor. This zoomed region is displayed full-screen on the display panel 104. As FIG. 7B illustrates, when the control pen 120 exerts only a light pressure on the sensing plate 102, the image is zoomed by a smaller zoom ratio and displayed full-screen on the display panel 104. When the control pen 120 exerts a greater pressure on the sensing plate 102, the image is zoomed by a larger zoom ratio and displayed full-screen on the display panel 104.

Figure 8A:
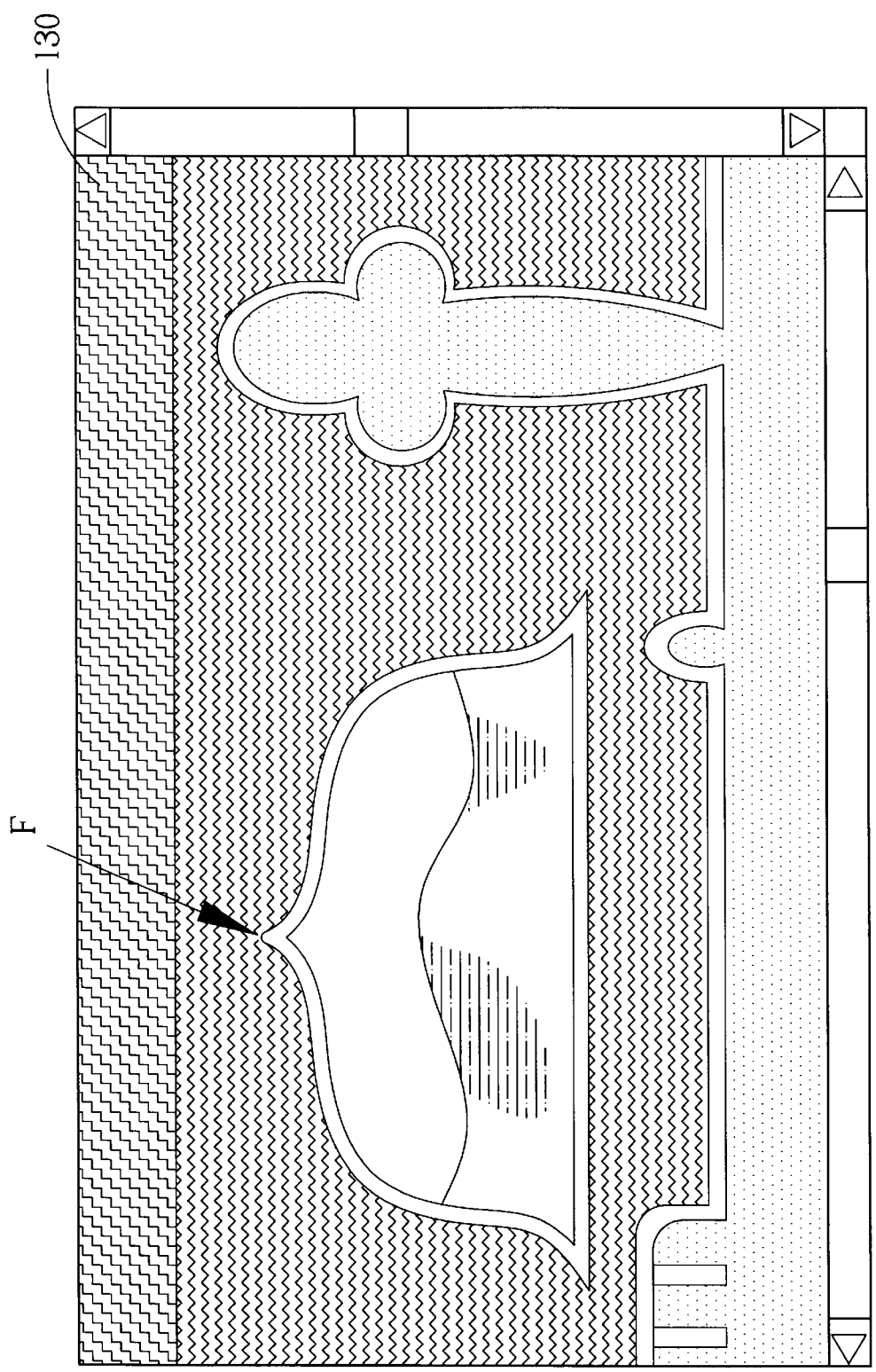
FIG. 8A is a diagram of the unmagnified display of a screen showing an unmagnified image.
Figure 8B:
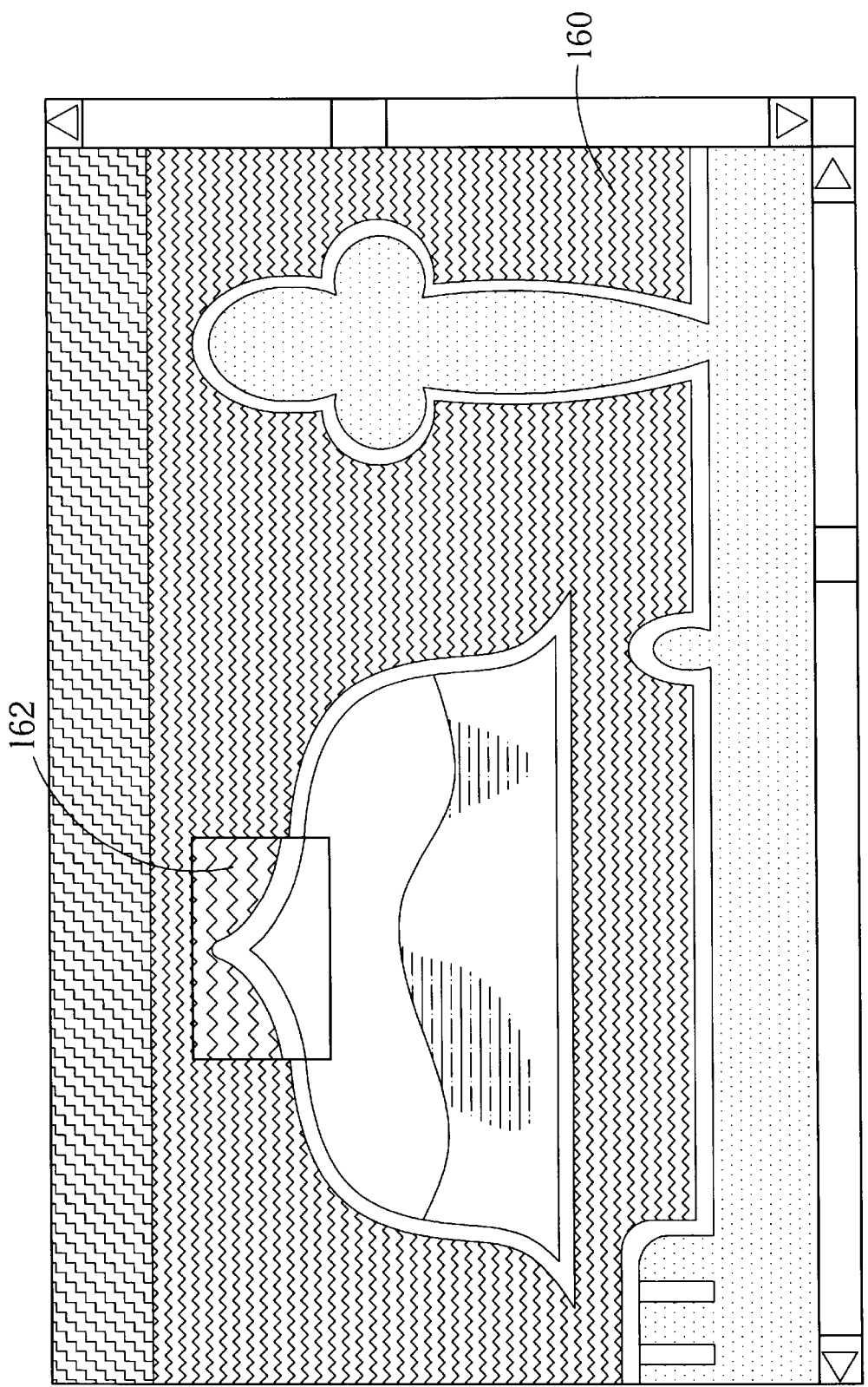
FIG. 8B is a diagram of the display of a screen showing an image magnified under light pressure using the second method of magnification.
Figure 8C:
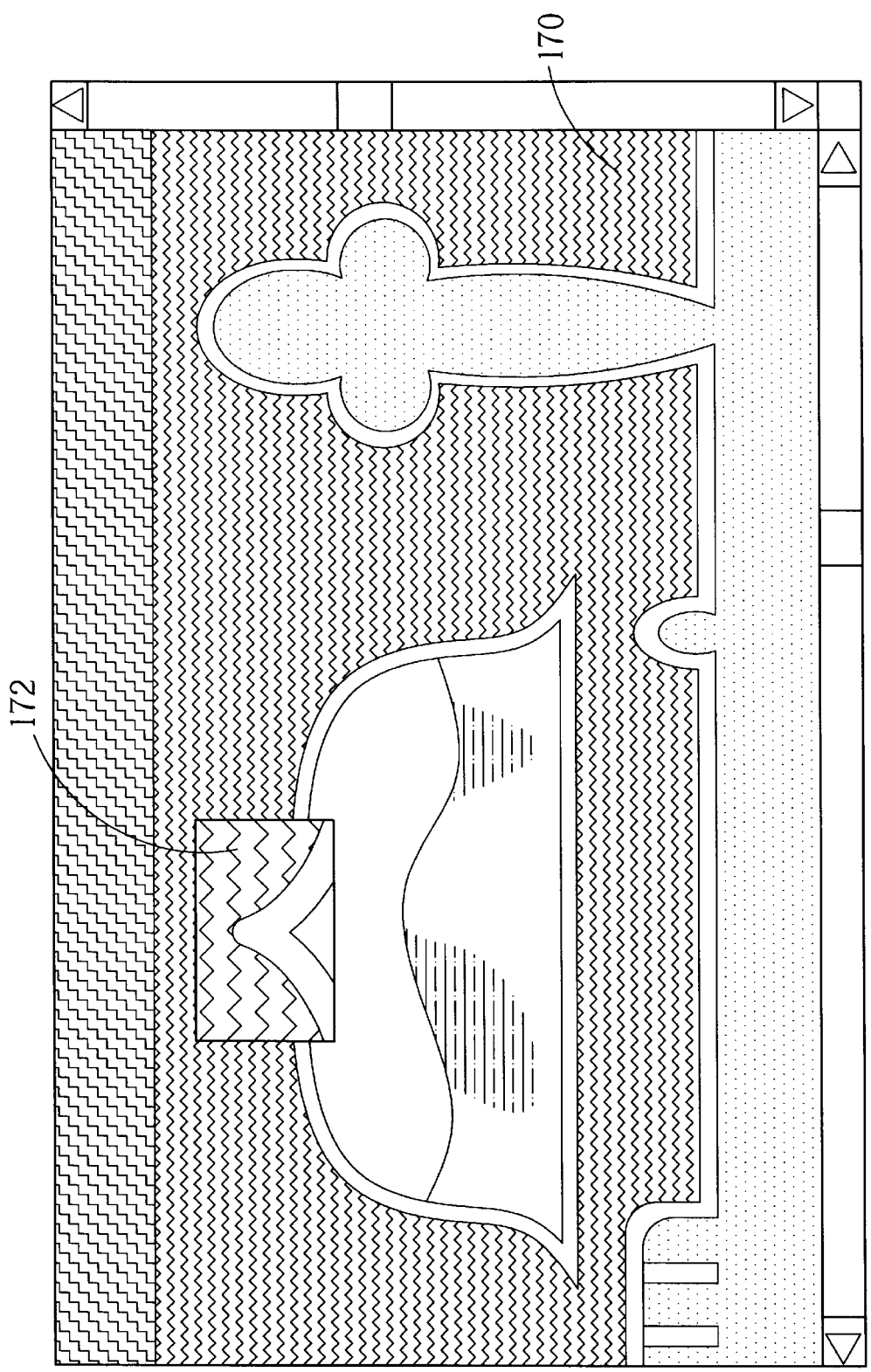
FIG. 8C is a diagram of the display of a screen showing an image magnified under greater pressure using the second method of magnification.

Please refer to FIGS. 8A to 8C. FIG. 8A is a diagram of a display 130 of a touch screen 100 showing an unmagnified image. FIG. 8B is a diagram of a display 160 showing an image magnified under light pressure using the second method of magnification. FIG. 8C is a diagram of a display 170 showing an image magnified under greater pressure using the second method of magnification. The display control 106 of the touch screen 100 uses a fixed display frame 162, 172. The zoomed-in region of the unmagnified image is specified by the position signal generated by the touch sensor, and the zoom ratio is determined by the pressure signal generated by the touch sensor. The resulting zoomed image is displayed in the fixed display frame 162, 172. The image 160, 170 outside the fixed display frame 162, 172 remains unchanged. As illustrated in FIG. 8A, the arrowhead F represents the location at which the control pen 120 touches the sensing plate 102. As illustrated in FIG. 8B, when a smaller pressure is exerted on the sensing plate 102 by the control pen 120, the portion of the unmagnified image at the touch point 122 is zoomed in by a smaller zoom ratio. The zoomed-in image is displayed inside a fixed display frame 162 expanded from the touch point 122. As FIG. 8C illustrates, when a greater pressure is exerted on the sensing plate 102 by the control pen 120, the portion of the unmagnified image at the touch point 122 is zoomed in by a greater zoom ratio. The zoomed-in image is displayed inside a fixed display frame 172 that is expanded from the touch point 122. In such an embodiment, the fixed display frame will move as the touch point 122 moves. In order to view the image more conveniently, the fixed display frame could instead be located at a stationary spot on the touch screen 100 so that regardless of the location of the touch point 122, the magnified content would be displayed inside a stationary fixed display frame.

Figure 9A:
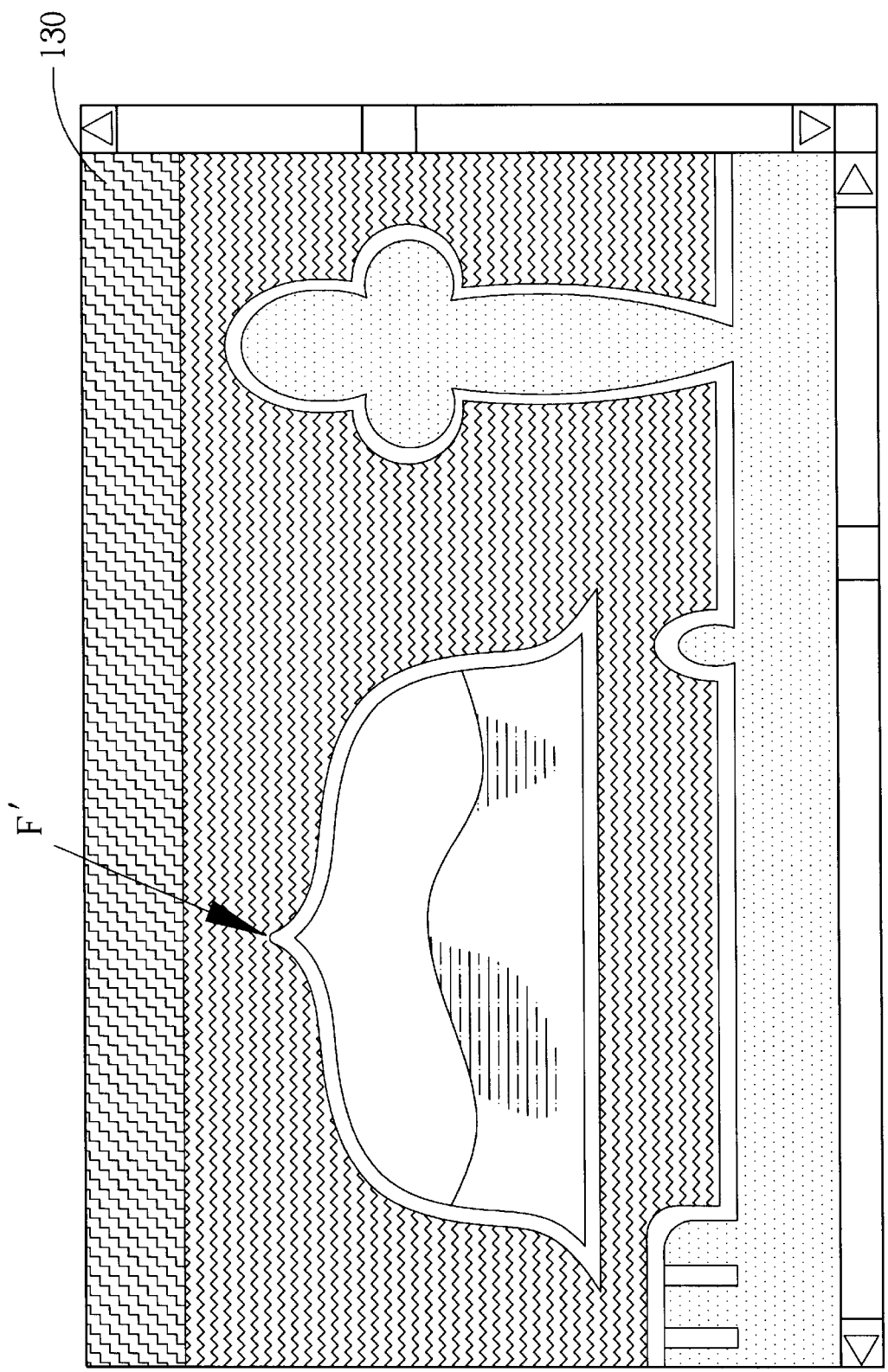
FIG. 9A is a diagram of a display of a screen showing an unmagnified image.
Figure 9B:
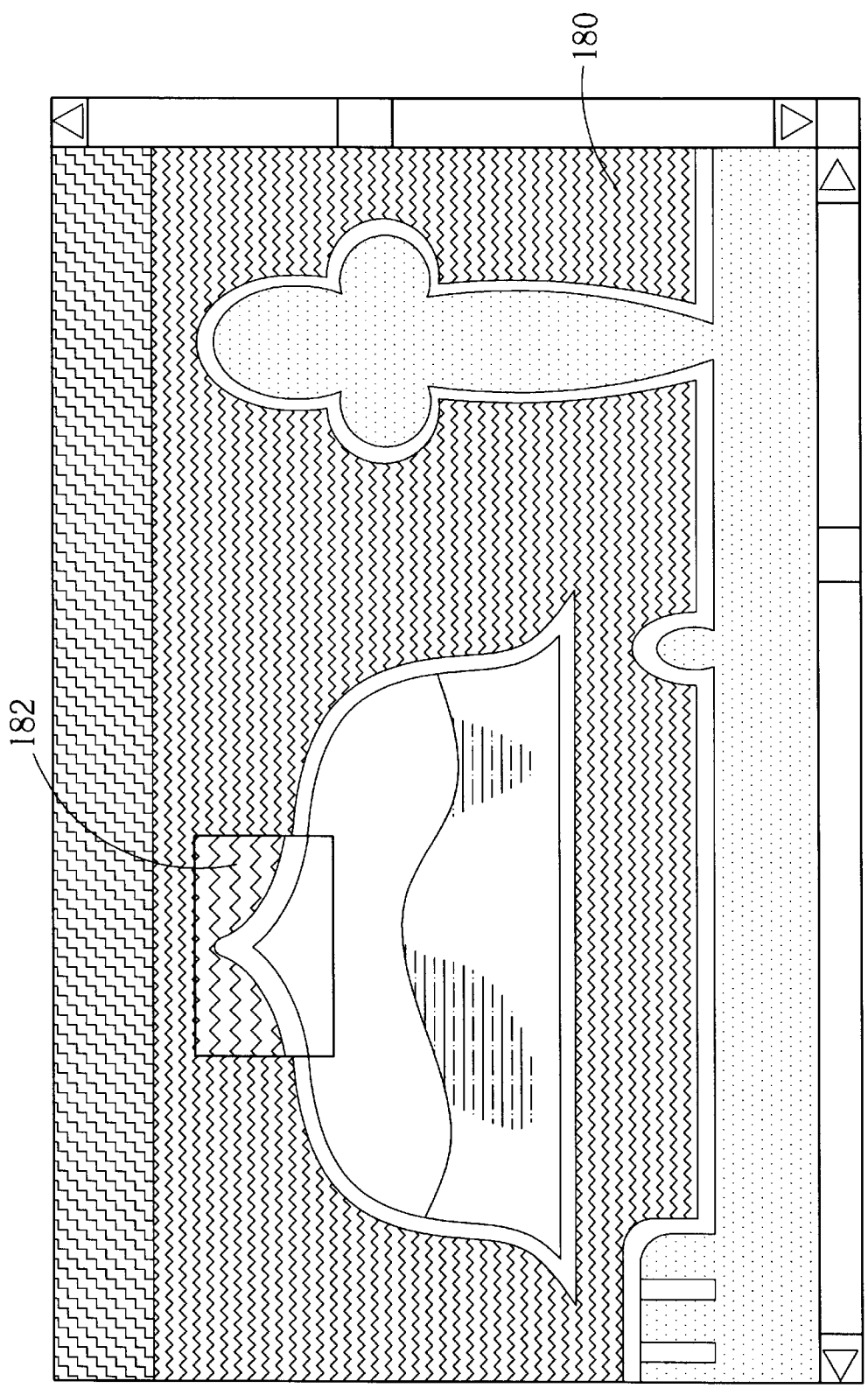
FIG. 9B is a diagram of the display of a screen showing an image magnified under light pressure using the third method of magnification.
Figure 9C:
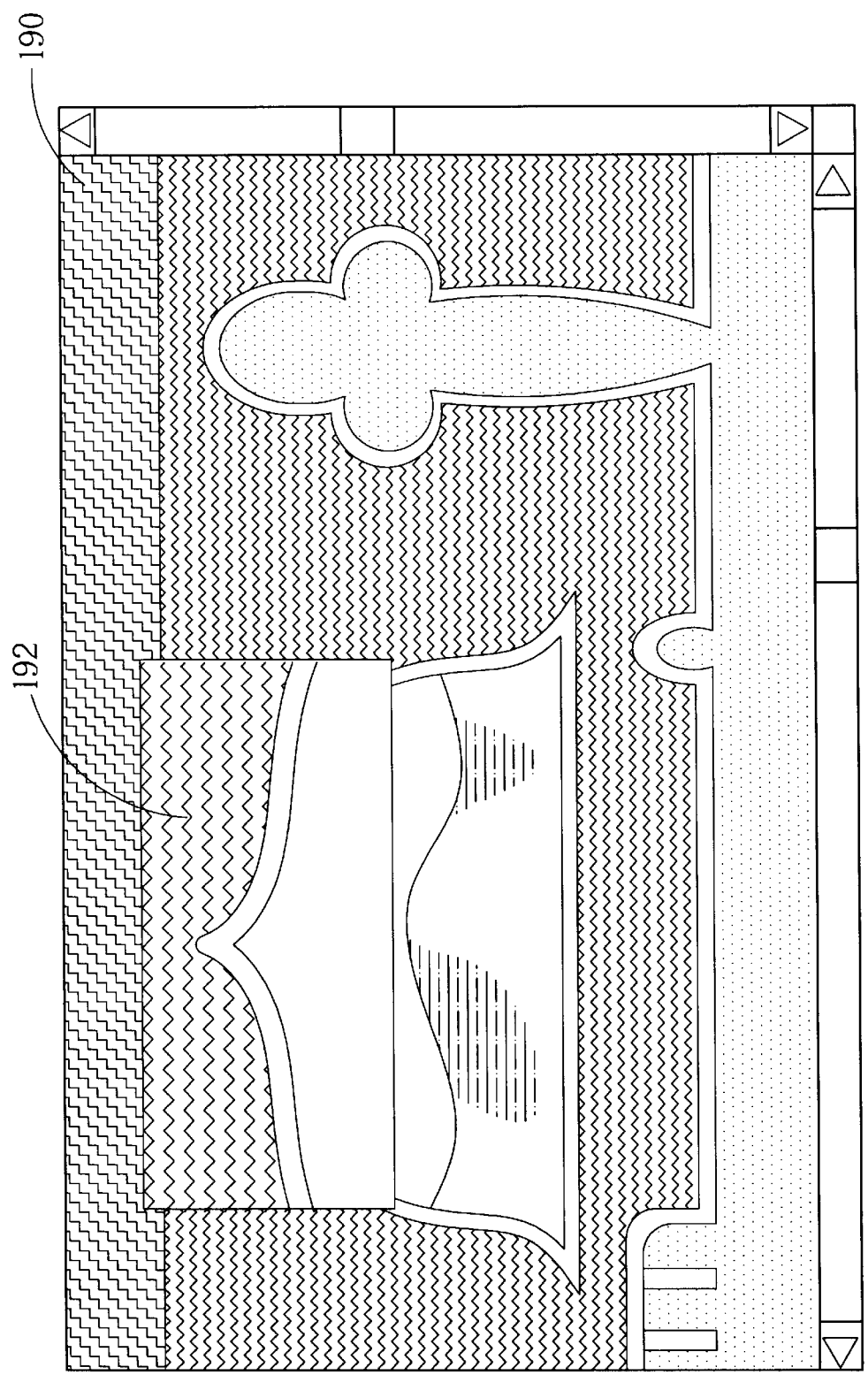
FIG. 9C is a diagram of the display of a screen showing an image magnified under greater pressure using the third method of magnification.

FIG. 9A is a diagram of a display 130 of a touch screen 100 showing an unmagnified image. FIG. 9B is a diagram of a display 180 of a touch screen 100 showing an image magnified under light pressure using a third method of magnification. FIG. 9C is a diagram of a display 190 of a touch screen 100 showing an image magnified under greater pressure using the third method of magnification. In this embodiment, the display control 106 of the touch screen 100 uses a variable display frame 182, 192. The variable display frame 182, 192 displays a zoomed portion of the image determined by the position signal generated from the touch sensor. The image 180, 190 outside the variable display frame 182, 192 remains unchanged. As illustrated in FIG. 9A, the arrowhead F represents a point at which the control pen 120 presses the sensing plate 102. As illustrated in FIG. 9B, when a light pressure is exerted on the sensing plate 102 by the control pen 120, the image at the touch point 122 is zoomed in and is displayed inside a small variable display frame 182 that is expanded from the touch point 122. As illustrated in FIG. 9C, when a greater pressure is exerted on the sensing plate 102 by the control pen 120, the image at the touch point 122 is zoomed in and displayed inside a larger variable display frame 182 that is expanded from the touch point 122.

In contrast to the prior art, the present invention makes use of the pressure generated by pressing the control pen 120 or other touch device on the sensing plate 102 to control the zoom ratio and zoom area. This is a powerful and convenient way for users to control what they see, and cannot be achieved by the prior art.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A touch screen comprising:
    a display panel for displaying an image;
    a touch sensor having a sensing surface for sensing intensity and position of an external force imposed thereon and generating a corresponding pressure signal and a position signal; and
    a display control electrically connected to display panel and the touch sensor for controlling the image and zooming in on a portion of the image according to the pressure signal and the position signal.

2. The touch screen of claim 1 wherein the touch sensor comprises:
    a transparent sensing plate having a plurality of sensing units each positioned at a predetermined position on the display panel for detecting intensity of an external force; and
    a pressure detector electrically connected to the sensing plate for detecting the intensity and position of the external force imposed on the sensing plate and generating corresponding pressure and position signals.

3. The touch screen of claim 2 wherein the transparent sensing plate is fixed on the display panel.

4. The touch screen of claim 2 wherein each sensing unit has a capacitor, and when an external force is imposed on one of the sensing units, capacitance of the sensing unit will change, and the pressure detector will generate the pressure signal according to the capacitance of the sensing unit and will generate the position signal according to the position of the sensing unit.

5. The touch screen of claim 1 wherein the display control will zoom the portion of the image corresponding to the position of the external force detected by the touch sensor and display that portion of the image full-screen on the display panel.

6. The touch screen of claim 1 wherein the display control will zoom in on the portion of the image corresponding to the position of the external force detected by the touch sensor in a fixed display frame on the display panel; the fixed display frame has the same size for different intensities of external forces; and the image outside of the fixed display frame will remain unchanged.

7. The touch screen of claim 6 wherein the fixed display frame is displayed at a position corresponding to the position of the external force detected by the touch sensor on the display panel.

8. The touch screen of claim 1 wherein the display control will zoom in on the portion of the image corresponding to the position of the external force detected by the touch sensor in a variable display frame on the display panel; the variable display frame has a size which varies with the intensity of the external force; and the image outside of the variable display frame will remain unchanged.

9. The touch screen of claim 1 wherein the display control uses a linear conversion model to zoom in on the image.

10. The touch screen of claim 1 wherein the display control uses a step conversion model to zoom in on the image; the step conversion model has a plurality of pressure sections each having a corresponding zoom ratio; and when receiving a pressure signal which falls within one of the pressure sections, the pressure signal will be converted to a corresponding zoom ratio.

* * * * *